(12) United States Patent
Hans et al.

(10) Patent No.: US 8,923,821 B2
(45) Date of Patent: *Dec. 30, 2014

(54) TRANSCEIVER WITH MESSAGE NOTIFICATION

(75) Inventors: Martin Hans, Hildesheim (DE); Frank Kowalewski, Salzgitter (DE); Josef Laumen, Hildesheim (DE); Gunnar Schmidt, Wolfenbuettel (DE); Joachim Steiger, Stuttgart (DE); Siegfried Baer, Pforzheim (DE); Mark Beckmann, Braunschweig (DE); Thomas Gottschalk, Berlin (DE)

(73) Assignee: IPCOM GmbH & Co. KG, Pullach (DE)

( * ) Notice: Subject to any disclaimer, the term of this patent is extended or adjusted under 35 U.S.C. 154(b) by 849 days.

This patent is subject to a terminal disclaimer.

(21) Appl. No.: 12/696,904

(22) Filed: Jan. 29, 2010

(65) Prior Publication Data

US 2010/0197280 A1  Aug. 5, 2010

Related U.S. Application Data

(63) Continuation of application No. 10/363,625, filed as application No. PCT/DE01/03304 on Aug. 30, 2001, now Pat. No. 7,684,789.

(30) Foreign Application Priority Data

Sep. 2, 2000  (DE) .................................. 100 43 284

(51) Int. Cl.
*H04M 1/725* (2006.01)
*H04M 1/663* (2006.01)
*H04M 3/537* (2006.01)
*H04M 19/04* (2006.01)
*H04W 52/02* (2009.01)

(52) U.S. Cl.
CPC .......... *H04M 1/72552* (2013.01); *H04M 3/537* (2013.01); *H04M 1/72519* (2013.01); *H04M 19/048* (2013.01); *H04W 52/027* (2013.01); *H04M 1/72547* (2013.01); *H04M 1/7255* (2013.01)
USPC .......................... 455/412.2; 455/413; 455/466

(58) Field of Classification Search
CPC .......... H04M 1/0266; H04M 1/72547; H04M 1/72552; H04W 52/0261
USPC ................ 455/466, 566, 567, 574, 73, 412.1, 455/412.2, 413, 415; 340/7.55
See application file for complete search history.

(56) References Cited

U.S. PATENT DOCUMENTS 4,633,041 A  12/1986  Boivie et al.
4,649,563 A  3/1987  Riskin
(Continued)

FOREIGN PATENT DOCUMENTS

DE  4332758 A1  3/1995
DE  19724995 A1  12/1998
(Continued)

OTHER PUBLICATIONS

Nokia 9000i, "User's Manual," (1995-1997).
(Continued)

*Primary Examiner* — Quochien B Vuong
(74) *Attorney, Agent, or Firm* — Nelson Mullins Riley & Scarborough LLP

(57) ABSTRACT

A transceiver, comprising an interface for receiving at least one message, a display unit provided to assume at least one switched-on operating state and at least one switched-off operating state, a message indicator indicating a receipt of a message by a unit of a signal, independent of the operating state of the display unit, wherein the message is associated with at least one message parameter, and a unit for evaluating the message parameter with the signal provided as a function of evaluation of the message parameter.

9 Claims, 2 Drawing Sheets

(56) References Cited

U.S. PATENT DOCUMENTS

| | | |
|---|---|---|
| 4,975,694 A | 12/1990 | McLaughlin et al. |
| 5,550,754 A | 8/1996 | McNelley et al. |
| 5,566,226 A * | 10/1996 | Mizoguchi et al. ............ 455/558 |
| 5,570,025 A | 10/1996 | Lauritsen et al. |
| 5,633,912 A * | 5/1997 | Tsoi ............... 455/566 |
| 5,737,394 A | 4/1998 | Anderson et al. |
| 5,881,377 A * | 3/1999 | Giel et al. ............ 455/574 |
| 5,946,636 A | 8/1999 | Uyeno et al. |
| 6,018,232 A | 1/2000 | Nelson et al. |
| 6,078,612 A * | 6/2000 | Bertrand et al. ............ 455/73 |
| 6,088,516 A | 7/2000 | Kreisel et al. |
| 6,104,923 A | 8/2000 | Kite |
| 6,119,014 A * | 9/2000 | Alperovich et al. .......... 455/466 |
| 6,125,286 A | 9/2000 | Jahagirdar et al. |
| 6,209,011 B1 | 3/2001 | Vong et al. |
| 6,295,458 B1 * | 9/2001 | Takahashi ............ 455/466 |
| 6,304,763 B1 | 10/2001 | Jahagirdar et al. |
| 6,311,282 B1 | 10/2001 | Nelson et al. |
| 6,330,461 B1 * | 12/2001 | Andersson ............ 455/566 |
| 6,377,821 B2 * | 4/2002 | Forlenzo et al. ............ 455/566 |
| 6,405,060 B1 * | 6/2002 | Schroeder et al. ............ 455/566 |
| 6,438,390 B1 | 8/2002 | Awan |
| 6,473,628 B1 * | 10/2002 | Kuno et al. ............ 455/566 |
| 6,720,863 B2 * | 4/2004 | Mager et al. ............ 340/7.51 |
| 6,751,484 B1 * | 6/2004 | Sandelius et al. ............ 455/566 |
| 7,054,626 B2 * | 5/2006 | Rossmann ............ 455/422.1 |
| 2004/0033783 A1 | 2/2004 | Hans et al. |

FOREIGN PATENT DOCUMENTS

| | | |
|---|---|---|
| DE | 19823882 A1 | 12/1998 |
| DE | 19857902 A1 | 6/2000 |
| DE | 10043284 C1 | 2/2002 |
| EP | 0457077 A2 | 11/1991 |
| EP | 0494525 A2 | 7/1992 |
| EP | 0633684 A2 | 1/1995 |
| EP | 0936793 A1 | 8/1999 |
| EP | 1316199 B1 | 6/2003 |
| GB | 2326051 | 12/1998 |
| JP | 10-164664 | 6/1998 |
| WO | 99/00962 A1 | 1/1999 |

OTHER PUBLICATIONS

Nokia, "Nokia 9000 Communicator, User's Manual," (1995).
Nokia, "First GSM-based communicator product hits the market. Nokia Starts Sales of the Nokia 9000 Communicator," Press Release (1996).
Nokia, "Nokia introduces the new Nokia 9000i Communicator for GSM Markets," Press Release (1997).

* cited by examiner

TRANSCEIVER WITH MESSAGE NOTIFICATION

RELATED APPLICATIONS

This application is continuation of U.S. patent application Ser. No. 10/363,625, filed Sep. 12, 2003 which is a 35 U.S.C. 371 national stage filing of International Application No. PCT/DE01/03304, filed 30 Aug. 2001, which claims priority to German Patent Application No. 100 43 284.0-35 filed on 2 Sep. 2000 in Germany. The contents of the aforementioned applications are hereby incorporated by reference.

BACKGROUND OF THE INVENTION

Mobile radio systems, for example mobile radio systems that function according to the GSM standard (group spéciale mobile), are designed to allow subscribers to the mobile radio network to send and receive short messages. One example of such a short message service is the so-called SMS service (short message service). In typical mobile telephones, the recipient of a short message of this kind is notified of its arrival by a corresponding indication on the display of the telephone.

SUMMARY OF THE INVENTION

The transceiver according to the invention, has the advantage over the prior art that a user of the transceiver can be notified—without changing the operating state of the display unit—that a message, for example a short message, has arrived for him. This is particularly advantageous if the display unit is switched off or in a power-saving mode. To be precise, the display unit can remain switched off or in the power-saving mode, but the user can still be notified that a message has been received. This reduces the energy requirements of the transceiver according to the invention, thus yielding a longer battery life. According to the invention, the user can also be optically notified the moment the message is received. This means that the user does not have to take any action, e.g. manipulating an actuating element of the transceiver, to be informed as to the reception status of messages sent to him—i.e. whether there is a message for him and if so, how many messages there are.

It is also advantageous that the message is associated with at least one message parameter, that the transceiver has means for evaluating the message parameter, and that the signal is provided as a function of the message parameter evaluation. This makes it possible to provide the user of the transceiver with information about the message parameter by varying the signal, in particular by chronologically changing the signal intensity of the output signal.

It is also advantageous that the number of the at least one received message and/or the type of the at least one received message and/or the sender of the at least one received message is provided as the message parameter. This makes it possible to provide the user of the transceiver with information regarding the number, the type, and/or the sender of the at least one received message, depending on the definition of the signal as a function of the message parameter(s).

It is also advantageous that the message indicator provides an output signal and that the signaling is provided by means of at least one predetermined intensity or intensity change of the output signal. This allows the information about the message parameter, which is to be transmitted by means of the signal, to be communicated to the user in a simple manner.

It is also advantageous that the number of the at least one intensity change corresponds to a multiple of the number of the at least one received message. This makes it possible, through simple means, to supply the user with data regarding how many messages have been received and are present.

It is also advantageous that the output signal is an optical signal and that the signaling is provided by means of a predetermined color or color change of the output signal. It is therefore possible to provide the user with more data regarding the message parameters or to relay the same data content more reliably, i.e. in a more easily recognizable and discernible way.

It is also advantageous that the message indicator is a light-emitting diode. This makes it possible, according to the invention, to transmit data to the user by means of the message indicator using simple means, i.e. inexpensively and at a low manufacturing cost.

It is also advantageous that the message indicator (15) can communicate a piece of operating data by means of an additional signal. As a result, the message indicator can be used, at least in chronological succession, both to communicate the receipt of the message by means of the signal and to communicate the operating data of the transceiver by means of the additional signal. Therefore in the transceiver according to the invention, it is not necessary to provide a separate indicator for the one function as well as for the other function.

It is also advantageous that an additional message indicator can communicate a piece of operating data by means of an additional signal. This makes it possible to easily distinguish between the operating data and the data that describe the message status.

BRIEF DESCRIPTION OF THE DRAWINGS

An exemplary embodiment of the invention is shown in the drawings and will be explained in detail the description that follows.

DESCRIPTION OF THE PREFERRED EMBODIMENTS

Figure 1:
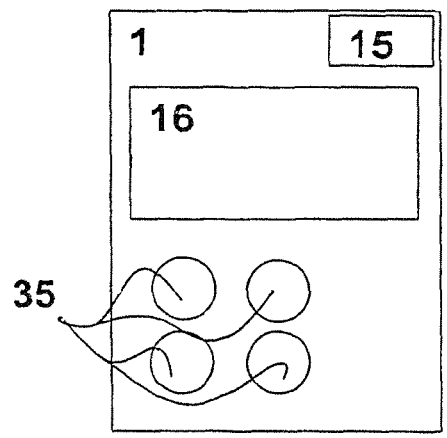
FIG. 1 shows a transceiver according to the invention.

Short message services, for example SMS service in a GSM mobile radio network (group speciale mobile), are enjoying ever greater distribution and acceptance despite their limitation to simple text messages and maximal text lengths of 160 characters. If larger text messages need to be sent, SMS, for example, offers the possibility of message concatenation, i.e. the total amount of the text to be sent is divided into a number of short messages. An appropriately specified mechanism provides for proper reassembly in the receiver.

Another supplemental service that SMS uses for notification is so-called unified messaging, a platform that combines fax, email, voicemail, etc. and offers a uniform access (usually via the Internet) to the data of these currently separate services. Here, too, the SMS messages constitute an important component, functioning as a notification for newly received data. For this reason, the invention will be described below by way of example in conjunction with SMS and SMS messages; however, it is not limited to being used exclusively with messages using the SMS standard.

The advantage of the short message service is that a message reaches the receiver directly or, if the mobile terminal is not available, is temporarily stored and is automatically resent when the mobile terminal once again becomes available. For this reason, in addition to the transmission of normal text messages, this service is also used for notification as a component of other services. One such supplemental service—which uses SMS for notification, is an essential component of modern mobile radio systems, and will also be a part of future mobile radio networks—is voicemail, i.e. the possibility of leaving a voice message for an unavailable recipient in a memory, thus performing the function of an answering machine, for example. Voicemail is one instance, as a rule a central one, in the mobile radio network of a network provider, which—similar to local answering machines connected to a user's telephone jack in the fixed network—offers the possibility of storing voice messages for a user of the mobile radio network. This can be the case if the person being called is unavailable at the time of the call, for example due to a dead zone in the coverage area of the mobile radio network or because the person being called does not have his mobile telephone turned on. If a caller then leaves a message in a voicemail box, then as a rule, the recipient is notified by means of an SMS text message as to the arrival and number of these new voice messages. As with every other SMS, this happens as soon as the mobile radio network reestablishes contact with the recipient's mobile telephone. Of the two cases mentioned above, in the first case, this would happen when the recipient comes back into a region with sufficient network coverage by his mobile radio network provider or in the second case, when the recipient reactivates his mobile telephone and the telephone logs itself back onto the mobile radio network.

In some mobile telephones, when an SMS message is received, the recipient is notified by means of a corresponding indication on the display unit of the telephone. However, many mobile telephones have the feature of a display unit, which automatically switches off or switches into a power-saving mode if unused for a certain amount of time by the user, to reduce the energy consumption of the mobile telephone in order to increase battery life. The sooner the display turns off, the less battery power is consumed, i.e. the longer the mobile telephone can be operated without having to recharge the battery. The display is reactivated, for example, by pressing the keypad of the mobile telephone. This means that the display device is switched off most of the time because most users do not use their mobile telephones actively for long periods.

If the display is turned off, this means that a user must first activate the display in order to check whether there are any messages, in particular short messages, waiting for him. In order to do so, the user must explicitly press or actuate a button or other actuating element on the mobile telephone. When a message has arrived, it is often difficult or impossible to notify the user by means of an acoustic signal, for example because the user has switched off the acoustic signaling due to the presence of other people or for other reasons, or because the user is out of earshot of the mobile telephone due to distance or noise.

One feature of the invention is that newly received messages can also be displayed in a transceiver, in particular a mobile telephone, independently of the display unit. This permits the immediate recognition of newly received messages even when a possible acoustic signal cannot be heard.

FIG. 1 schematically depicts a transceiver 1 according to the invention. The transceiver 1 is provided in the form of a mobile telephone, cell phone, etc., and according to the invention, particularly functions in accordance with a standard for wireless communication, for example GSM, UMTS, or the like. According to the invention, the transceiver 1 includes the display unit 16, which is also referred to as the display 16. The transceiver 1 also includes a message indicator 15 and actuating elements 35, for example buttons or the like. In particular, the message indicator 15 is provided in the form of an LED (light emitting diode) and will therefore also be referred to below as the LED 15. According to the invention, the LED 15 is in particular embodied as a multicolor LED 15, i.e. the message indicator 15 can display several colors. This potentially broadens the data content of a signal that can be conveyed to the user by means of the message indicator 15. In one exemplary embodiment, the LED 15 is embodied, for example, as a dual-color LED 15.

The actuating elements 35 are also referred to below as an input device 35. According to the invention, the display unit 16 can assume various operating states, at least one switched-on or activated operating state, and one switched-off operating state or an operating state with reduced activation (e.g. power-saving mode).

Figure 2:
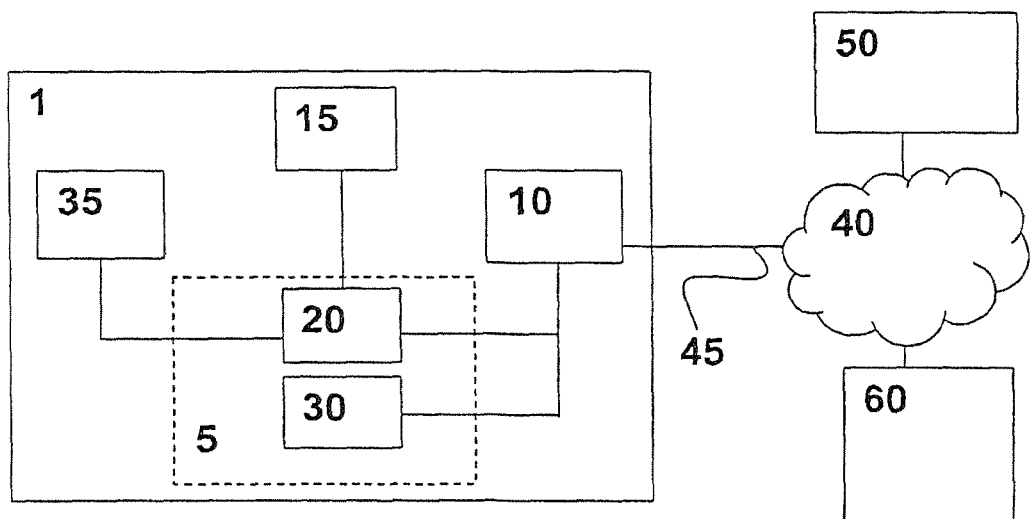
FIG. 2 shows the transceiver according to the invention, connected to a mobile radio network.

FIG. 2 shows the transceiver 1 connected to a mobile radio network 40. The transceiver 1 is connected to the mobile radio network 40 by means of an air interface 45. A device 50 is also connected to the mobile radio network 40 in a wireless fashion or via wires; the device 50 provides supplemental services in the mobile radio network 40, for example a voicemail service. A communication terminal 60 is also connected to the mobile radio network 40, as a rule by means of a wireless interface that is not shown in detail. According to the invention, the mobile radio network 40 particularly functions in accordance with a standard for wireless communication, for example GSM, UMTS, or the like. According to the invention, the transceiver 1 includes, as a means for evaluating message parameters, an evaluation unit 20, which is connected to the input device 35, a send/receive device 10, and the display unit 16. In addition, the transceiver 1 has a memory a 30 for storing data, for example short messages, which is connected to the send/receive device 10.

In a GSM-compatible transceiver 1, the memory 30 is contained as a rule in an identification module, for example the SIM module (subscriber identification module). If the SAT standard (SIM application toolkit) is included, then it is possible to combine the memory 30 and the evaluation unit 20 onto one SIM module 5. This possibility is indicated in FIG. 2 by the fact that the dashed line of the SIM module 5 encompasses the evaluation unit 20 and the memory 30.

The send/receive device 10 receives a short message from a mobile radio network 40 by means of the air interface 45, for example from the telecommunication terminal 60, from a supplementary service operated in the mobile radio network 40, or a device 50 required for this supplementary service. The short message is processed in the transceiver 1, i.e. is displayed on the display unit 16—if this is in a switched-on operating state—and is stored in the memory 30. In addition, the message is sent to the evaluation unit 20, which in the simplest case registers the receipt of the message and displays or signals its arrival by means of the message indicator 15.

The input device 35 can be used to input data for controlling the evaluation unit 20 and configuring it so that the display unit 16 and/or the message indicator 15, for example, only display(s) selected short messages or so that different messages are displayed in different ways. One selection criterion, for example, is the telephone number of the sender, the type of message, the number of received messages, and/or whether the user has already accessed the message, i.e. whether the user has already listened to the message.

In the following exemplary embodiment, it has been assumed by way of example that the evaluation unit 20 functions using the sender's telephone number as a selection criterion. The user can use the input device 35 to configure the evaluation unit 20 in such a way that on the one hand, upon receipt of a short message that has been sent by the telecommunication terminal 60, which is associated with a particular telephone number—for example the number "0172/4999008", the message indicator 15 emits a signal, e.g. blinks, with a first color, and on the other hand, upon receipt of a short message as a notification regarding the receipt of a voice message in a voicemail box, the message indicator 15 emits a signal, e.g. blinks, with a second color.

The signal, which is embodied, for example, as a blink sequence, conveys information regarding the number of messages received, or regarding other message parameters. This is possible because it indicates the arrival or presence of for example three (e.g. unplayed) messages in the device SO that is embodied for example as a voicemail box, when the message indicator 15 blinks three times in rapid succession in one of its possible colors.

Figures 3, 4:
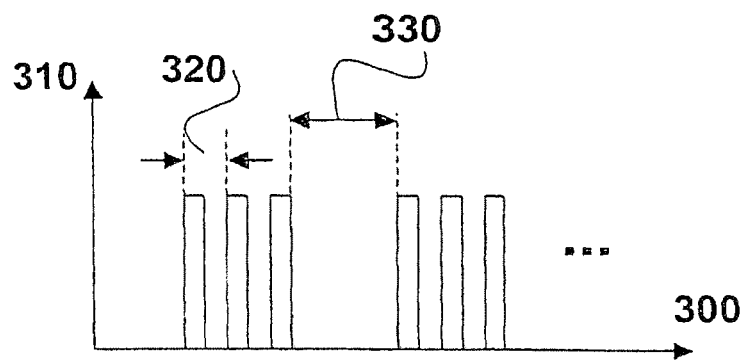
FIG. 3 shows a flowchart for the evaluation of a message parameter of a received message.
FIG. 4 shows an example of signaling a message parameter.

In order to illustrate the exemplary embodiment, FIG. 3 shows a flowchart. At a first program point 100, a short message is received and at a second program point 110, it is stored, particularly in the memory 30. At a third program point 200, the received short message is evaluated in accordance with one or more message parameters; in the exemplary embodiment, the telephone number of the sender of the message has been selected as a message parameter. The example under consideration includes the following cases by way of example: a first case labeled with the reference numeral 201, which exists when a message has been received from the telecommunication terminal 60 that is associated, for example, with the telephone number "0172/4999008"; a second case labeled with the reference numeral 204, which corresponds to the arrival of a message from the device 50, i.e. for example a voicemail box; a third case labeled with the reference numeral 208, which encompasses all other situations. If it is determined at the third program point 200 that the first case 201 applies, then at a fourth program point 210, a first counter, not shown, is incremented and at a fifth program point 220, the new state is displayed by the blinking of the LED 15 in the first color. If it is determined at the third program point 200 that the second case 204 applies, then at a sixth program point 260, a second counter, likewise not shown, is incremented and at a seventh program point 280, the new state is displayed by the blinking of the LED 15 in the second, e.g. other, color. If it is determined at the third program point 200 that the third case 208 applies, then no further action occurs.

The evaluation in the evaluation unit 20 is not limited to the telephone number of the sender. It can also relate to the text of the message or short message, the type of message, the number of messages received, or the like. For example, the presence or lack of the words "mailbox" or "e-mail" are used as selection criteria in order to determine the type of message. Likewise, elements of the SMS header, i.e. the top part of an SMS message, or of the SMS user data header can be used for the selection. In addition, it is also appropriate here to use special user-defined selection criteria, which make it possible to recognize particular notifications, i.e. particular messages, and to handle them in a particular manner, for example by having the message indicator 15 emit a special signal or by storing certain messages differently than other messages, for example storing them in the memory 30. It is therefore possible to recognize the receipt of e-mails via SMS through the recognition of particular header elements, which can also be used as selection criteria. In addition, the messages received can thus be stored in a sorted fashion, for example.

FIG. 4 shows an example of a message indicator 15 signal. In a graph of the intensity 310 of the output signal of the message indicator 15 over its chronological course 300, a blink sequence is shown, which is characterized by the fact that blinks occur three times with a first chronological spacing 320. A single blink is produced by the fact that the intensity 310 of the output signal of the message indicator 15 changes for example twice, i.e. the intensity 310 is adjusted from a first value to a second value and—after a certain waiting period—is adjusted back to the first value in order to remain there for a certain additional waiting period. The first chronological spacing 320 corresponds to the time interval beginning with the intensity change from the first value of the intensity 310 to the second value of the intensity 310 and extending to the end of the additional waiting period after the readjustment of the intensity 310 of the output signal back to the first value. The above-described sequence of three blinks—i.e. a total of six changes in the intensity of the output signal—the number of intensity changes corresponds to twice the number of received messages—gives an example of how it is possible according to the invention, to signal the receipt of three new messages. FIG. 4 shows two such blink sequences; a second chronological spacing 330 is provided between the blink sequences. The second chronological spacing 330 is provided so that the user can differentiate or distinguish between the blink sequences, for example by virtue of the fact that the second chronological spacing 330 is greater than the first chronological spacing. Other possibilities for embodying the message indicator 15 signal are achieved by virtue of the fact that the intensity of the output signal of the message indicator 15 does not change in a binary fashion as shown in FIG. 4—i.e. there are only two states—, but rather the signal can also be provided so that there are more than two discrete values for the intensity 310 and so that the intensity change of the output signal from one of these discrete values to another of these discrete values sends the user information about a received message.

According to the invention, another embodiment includes the provision of using the message indicator 15 to send the user other data, in particular operating data, in addition to the data regarding the status of the message reception or the arrival of a message. In this case, operating data are understood in particular to include the charge state of the battery, not shown, or accumulator, not shown, (battery status), data regarding the availability of the mobile radio network 40, or data regarding whether or not the transceiver 1 is currently logged onto the mobile radio network 40. It was already possible before now to convey such operating data to the user by means of an additional signal particularly by using light emitting diodes. For information of a content-related nature about messages, such as the number, type, or even the sender of messages among others, though, transceivers previously always used the display unit, which resulted in the above-explained disadvantages, particularly the higher power consumption and the complex operation of such transceivers.

It is in keeping with the invention to execute the additional signaling of operating data and the signaling of content-related information, i.e. regarding the receipt of messages for example, to the user both separately, i.e. using the message indicator 15 and an additional message indicator not shown here—for example with two different light emitting diodes—and jointly, i.e. using the message indicator 15 both for signaling the operating data and for signaling the status of the message reception. In the second case, for example, the operating data are signaled exclusively by means of a third color, while the content-related information is only signaled by means of the first and second color.

It need only be indicated as an exemplary embodiment here that a transceiver 1 according to the invention is equipped, for example, in such a way that the LED 15 blinks with a relatively low frequency in a red color if the transceiver 1 is no longer receiving the regular signals of the mobile radio network 40 or is only receiving them poorly, e.g. in the case of a dead zone in the coverage of the mobile radio network 40. In this exemplary embodiment, if the battery is almost dead, then the LED 15 blinks with a high frequency and likewise in the red color, independent of whether the transceiver 1 has reception or not. If the transceiver 1 is logged onto the network and is also still receiving the regular signals of the mobile radio network, then the LED 15 blinks with a relatively low frequency in the green color. In this exemplary embodiment, the user therefore can always see whether the transceiver 1 has reception and whether the battery urgently needs to be charged—and this, independent of whether the display unit is switched on, switched off, or in a power-saving mode. In order to signal the receipt of the message, in this case, the invention includes the provision that the light emitting diode blinks in a blue color, for example.

On the other hand, however, it is also in keeping with the invention not to provide an additional color of the LED 15 for signaling the receipt of a message, but merely to provide a different blink signal than the low frequency blinking in the green color, which occurs in the exemplary embodiment under consideration when the transceiver 1 both has contact with the mobile radio network and also has sufficient energy reserves. This assures that the user always knows whether or not the transceiver 1 is logged onto the mobile radio network 40. For example, if there are now three new messages, then the LED 15 blinks three times with a chronological spacing of the blink signal, which corresponds to the first spacing 320. This is selected so that an average blink frequency between the two low frequency blinks is set to signal a proper network connection on the one hand and that of the high frequency blinks is set to signal an insufficient charge of the battery on the other hand. Then the LED 15 executes a long pause before it blinks again three times in the average blink frequency. The duration of the long pause here should be at least as long as the chronological spacings of the blink signal of the low frequency blinking.

The invention claimed is:

1. A mobile phone comprising a housing having a front, a display unit, actuating elements and a message indicator being positioned on the front, wherein the actuating elements are positioned underneath said display unit and the message indicator is positioned above the display unit adjacent an upper edge of the housing, and wherein the message indicator is a multicolor light emitting diode,
wherein the mobile phone further comprises an evaluation unit and a chargeable battery, the evaluation unit being adapted to receive incoming messages and control the message indicator, wherein in response to an e-mail message being received the message indicator is caused to blink with a first color and when the battery needs to be charged the message indicator is caused to blink with a second color, wherein the operation of the message indicator is independent of an operating state of the display unit.

2. The mobile phone according to claim 1, wherein the phone is adapted to operate according to the GSM and UMTS mobile telephone standards.

3. The mobile phone according to claim 1, wherein the second color is red.

4. The mobile phone according to claim 3, wherein the first color is blue.

5. The mobile phone according to claim 1, wherein the evaluation unit is encompassed by a subscriber identity module.

6. The mobile phone according to claim 1, wherein the light emitting diode is operable to emit light of a third color.

7. The mobile phone according to claim 1, wherein the phone further comprises a memory connected to a send and receive device.

8. The mobile phone according to claim 1, wherein the actuating elements are buttons.

9. The mobile phone according to claim 1, wherein the evaluation unit is controllable so that input may configure the evaluation unit to customize indicators provided by the message indicator.

* * * * *